US012053754B2

(12) United States Patent
Thoniyot et al.

(10) Patent No.: US 12,053,754 B2
(45) Date of Patent: Aug. 6, 2024

(54) METHOD OF PRODUCING CAPSULES AND RELATED CAPSULES

(71) Applicant: Agency for Science, Technology and Research, Singapore (SG)

(72) Inventors: Praveen Thoniyot, Singapore (SG); Alexander M. Van Herk, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 612 days.

(21) Appl. No.: 17/279,001

(22) PCT Filed: Sep. 24, 2019

(86) PCT No.: PCT/SG2019/050487
§ 371 (c)(1),
(2) Date: Mar. 23, 2021

(87) PCT Pub. No.: WO2020/067998
PCT Pub. Date: Apr. 2, 2020

(65) Prior Publication Data
US 2022/0032254 A1 Feb. 3, 2022

(30) Foreign Application Priority Data
Sep. 24, 2018 (SG) .............................. 10201808333P

(51) Int. Cl.
*B01J 13/08* (2006.01)
*C01B 33/14* (2006.01)
(52) U.S. Cl.
CPC ............... *B01J 13/08* (2013.01); *C01B 33/14* (2013.01)

(58) Field of Classification Search
CPC . B01J 13/08; B01J 13/203; B01J 13/22; B01J 13/18; C01B 33/14; C01B 33/145; C01B 33/143; C11D 3/505; C11D 3/046; C11D 7/10; C11D 7/20; C11D 3/162; C11D 3/124; C11D 17/0039
See application file for complete search history.

(56) References Cited

U.S. PATENT DOCUMENTS

2008/0317795 A1\* 12/2008 Traynor ................. A61Q 19/10
424/59

FOREIGN PATENT DOCUMENTS

CN   100558403 C   11/2009
CN   107519149 A   12/2017
(Continued)

OTHER PUBLICATIONS

Galarneau et al "Synthesis of Sponge Mesoporous Silicas From Lecithin/Dodecylamine Mixed-Micelles in Ethanol/Water Media: A Route Towards Efficient Biocatalysts" Microporous and Mesoporous Materials vol. 104, pp. 103-114, 2007.
(Continued)

*Primary Examiner* — Emmanuel S Luk
*Assistant Examiner* — Elisa H Vera
(74) *Attorney, Agent, or Firm* — Morse, Barnes-Brown & Pendleton, P.C.; Martin Z. Zhang

(57) ABSTRACT

There is provided a method of producing silica capsules, the method comprising: adding a silica precursor to emulsified droplets in the presence of salt and alcohol to enhance silica growth around the emulsified droplets by an ion association effect, thereby forming silica capsules. Also provided are silica capsules producible by such a method.

18 Claims, 13 Drawing Sheets

(56) References Cited

FOREIGN PATENT DOCUMENTS

WO     WO-2006/133519 A1     12/2006
WO     WO-2010/103514 A1     9/2010

OTHER PUBLICATIONS

Kaewsaneha, et al., "Preparation of Core-Shell Particle of Disinfectant Agent Nanocapsules-Skim Rubber Particles by the Heterocoagulation Technique," Macromolecular Research, vol. 18, No. 9. pp. 876-883, Sep. 23, 2010.

Luna-Xavier, et al., "Preparation of nano-sized silica/poly(methyl methacrylate) composite latexes by hetero-coagulation: comparison of three synthetic routes," Polymer International, vol. 53, No. 5. pp. 609-617, Apr. 21, 2004.

Zhang, et al., "Cationic poly (e-caprolactone) surface functionalized mesoporous silica nanoparticles and their application in drug delivery," Applied Surface Science, vol. 276. pp. 769-775, Apr. 2, 2013.

Zhu, et al., "Study on Hetero-coagulation Process of PTFE Latex Particles and FE2O3 particles," Huagong Shengchan Yu Jishu., vol. 3, No. 11. pp. 1-3, Dec. 31, 2004.

* cited by examiner

| Trial No | | | | |
|---|---|---|---|---|
| 1 | A |  | B |  |
| 2 | A |  | B |  |
| 3 | A |  | B |  |
| 4 | A |  | B |  |
| 5 | A |  | B |  |

METHOD OF PRODUCING CAPSULES AND RELATED CAPSULES

CROSS REFERENCE TO RELATED APPLICATIONS

This application is the National Stage of International Application No. PCT/SG2019/050487, filed on Sep. 24, 2019, which claims priority to Singaporean Application No. 10201808333P, filed on Sep. 24, 2018. The contents of both applications are hereby incorporated by reference in their entirety.

TECHNICAL FIELD

The present disclosure relates to a method of producing a capsule (such as a silica capsule) as well as a capsule producible by such a method.

BACKGROUND

Robust capsules are desirable for various applications including applications for coatings, flavours and personal care formulations. In coating applications, for example, one would need robust capsules for carrying oil, liquid polymers, mixtures of polymeric oils or mixtures of polymeric and waxy materials. Capsules produced by conventional methods, however, typically suffer from easy breakage or rupture. This may cause an unwanted leakage of the contents carried by the capsules. Furthermore, many of the conventional methods require multiple steps, expensive reagents, and they also suffer from low scalability and reproducibility.

For example, existing methods for producing silica capsules that involve emulsification, hydrolysis and condensation of reactants face problems of consistent reproducibility. Furthermore, silica capsules obtained by following these conventional methods were also found to be easily breakable. When these silica capsules were subjected to stress testing, they ruptured under mechanical stress and were unable to withstand the high shear mixing that was used for preparing a coating formulation. Clearly, these methods are not suitable for producing silica capsules for stress-intensive applications such as coating applications.

In view of the above, there is thus a need to provide a method of producing capsules (such as silica capsules) as well as capsules producible by such a method that address or at least ameliorate one or more of the above problems.

SUMMARY

In one aspect, there is provided a method of producing silica capsules, the method comprising: adding a silica precursor to emulsified droplets in the presence of salt and alcohol to enhance silica growth around the emulsified droplets by an ion association effect, thereby forming silica capsules.

In one embodiment, the salt is present at a concentration of from 10 mM to 20 mM.

In one embodiment, the alcohol is present at a concentration of at least about 20% v/v.

In one embodiment, the adding step is carried out in an acidic pH environment.

In one embodiment, the acidic pH is from pH 2 to pH 5.

In one embodiment, the salt comprises an inorganic salt.

In one embodiment, the inorganic salt comprises a metal salt.

In one embodiment, the alcohol is selected from the group consisting of: methanol, ethanol, propanol, isopropanol and combinations thereof.

In one embodiment, the silica precursor comprises an alkoxy silane.

In one embodiment, the method is carried out at a temperature of no more than about 60° C.

In one embodiment, the emulsified droplets are substantially non-polar.

In one embodiment, the method further comprises dispersing a substantially non-polar substance in a polar solvent to obtain the emulsified droplets.

In one embodiment, the method further comprises evaporating the emulsified droplets encapsulated by the silica capsules to obtain hollow silica capsules.

In one embodiment, the method is carried out using water as the primary medium.

In one embodiment, the method further comprises concentrating the silica capsules to an amount of at least about 30 wt % in water.

In one aspect, there is provided a silica capsule produced by embodiments of the method, wherein the silica capsule is no more than about 100 microns in size and is substantially resistant to breaking under scanning electron microscopy (SEM) vacuum conditions.

In one embodiment, the silica capsule further comprises a substantially non-polar substance encapsulated by the silica capsule.

In one embodiment, the substantially non-polar substance is selected from the group consisting of: aroma, flavour, fragrance, perfume, drug, therapeutic, phase change material, cosmetic, skin care substance, silicone oil, pentane, dodecane and combinations thereof.

In one embodiment, the silica capsule is substantially hollow.

In one embodiment, the silica capsule has one or more of the following properties: (i) capable of being loaded with cargo of at least about 80% by weight of the loaded silica capsule without substantial breakage; (ii) capable of being concentrated in water to a concentration of at least about 30 wt % without substantial breakage, (iii) capable of being subjected to scanning electron microscopy (SEM) vacuum conditions without substantial breakage, and (iv) is stable under ambient conditions for no less than about 6 months without substantial breakage.

Definitions

The term "micro" as used herein is to be interpreted broadly to include dimensions from about 1 micron to about 1000 microns.

The term "nano" as used herein is to be interpreted broadly to include dimensions less than about 1000 nm.

The term "particle" as used herein broadly refers to a discrete entity or a discrete body. The particle described herein can include an organic, an inorganic or a biological particle. The particle used described herein may also be a macro-particle that is formed by an aggregate of a plurality of sub-particles or a fragment of a small object. The particle of the present disclosure may be spherical, substantially spherical, or non-spherical, such as irregularly shaped particles or ellipsoidally shaped particles. The term "size" when used to refer to the particle broadly refers to the largest dimension of the particle. For example, when the particle is substantially spherical, the term "size" can refer to the diameter of the particle; or when the particle is substantially non-spherical, the term "size" can refer to the largest length of the particle.

The terms "coupled" or "connected" as used in this description are intended to cover both directly connected or connected through one or more intermediate means, unless otherwise stated.

The term "associated with", used herein when referring to two elements refers to a broad relationship between the two elements. The relationship includes, but is not limited to a physical, a chemical or a biological relationship. For example, when element A is associated with element B, elements A and B may be directly or indirectly attached to each other or element A may contain element B or vice versa.

The term "adjacent" used herein when referring to two elements refers to one element being in close proximity to another element and may be but is not limited to the elements contacting each other or may further include the elements being separated by one or more further elements disposed therebetween.

The term "and/or", e.g., "X and/or Y" is understood to mean either "X and Y" or "X or Y" and should be taken to provide explicit support for both meanings or for either meaning.

Further, in the description herein, the word "substantially" whenever used is understood to include, but not restricted to, "entirely" or "completely" and the like. In addition, terms such as "comprising", "comprise", and the like whenever used, are intended to be non-restricting descriptive language in that they broadly include elements/components recited after such terms, in addition to other components not explicitly recited. For example, when "comprising" is used, reference to a "one" feature is also intended to be a reference to "at least one" of that feature. Terms such as "consisting", "consist", and the like, may in the appropriate context, be considered as a subset of terms such as "comprising", "comprise", and the like. Therefore, in embodiments disclosed herein using the terms such as "comprising", "comprise", and the like, it will be appreciated that these embodiments provide teaching for corresponding embodiments using terms such as "consisting", "consist", and the like. Further, terms such as "about", "approximately" and the like whenever used, typically means a reasonable variation, for example a variation of +/−5% of the disclosed value, or a variance of 4% of the disclosed value, or a variance of 3% of the disclosed value, a variance of 2% of the disclosed value or a variance of 1% of the disclosed value.

Furthermore, in the description herein, certain values may be disclosed in a range. The values showing the end points of a range are intended to illustrate a preferred range. Whenever a range has been described, it is intended that the range covers and teaches all possible sub-ranges as well as individual numerical values within that range. That is, the end points of a range should not be interpreted as inflexible limitations. For example, a description of a range of 1% to 5% is intended to have specifically disclosed sub-ranges 1% to 2%, 1% to 3%, 1% to 4%, 2% to 3% etc., as well as individually, values within that range such as 1%, 2%, 3%, 4% and 5%. The intention of the above specific disclosure is applicable to any depth/breadth of a range.

Additionally, when describing some embodiments, the disclosure may have disclosed a method and/or process as a particular sequence of steps. However, unless otherwise required, it will be appreciated that the method or process should not be limited to the particular sequence of steps disclosed. Other sequences of steps may be possible. The particular order of the steps disclosed herein should not be construed as undue limitations. Unless otherwise required, a method and/or process disclosed herein should not be limited to the steps being carried out in the order written. The sequence of steps may be varied and still remain within the scope of the disclosure.

Furthermore, it will be appreciated that while the present disclosure provides embodiments having one or more of the features/characteristics discussed herein, one or more of these features/characteristics may also be disclaimed in other alternative embodiments and the present disclosure provides support for such disclaimers and these associated alternative embodiments.

DESCRIPTION OF EMBODIMENTS

Example, non-limiting embodiments of a method of producing a capsule (such as a silica capsule) as well as a capsule producible by such a method are disclosed hereinafter.

In various embodiments, there is provided a method of preparing a capsule, the method comprising: regulating the relative rates of hydrolysis and condensation of a silica precursor on an emulsified droplet to form a silica capsule encapsulating the emulsified droplet. In various embodiments, the regulating step comprises regulating ionic strength and amount of a co-solvent or an alcohol prior to/when hydrolysing and/or condensing the silica precursor on the emulsified droplet. In various embodiments, regulating ionic strength comprises providing salts. In various embodiments, the ionic strength and the co-solvent or alcohol synergistically regulates/influences the relative rates of hydrolysis and condensation.

In various embodiments, regulating the relative rates of hydrolysis and condensation comprises regulating the relative rates through an ion association effect. In various embodiments, regulating the relative rates of hydrolysis and condensation comprises reducing/decreasing/slowing down the rate of hydrolysis. In various embodiments, reducing/decreasing/slowing down the rate of hydrolysis leads to the formation of bigger oligomers before condensation, thereby leading to the creation/formation of stronger/more resistant/more robust silica capsule e.g. the rate of hydrolysis may be slowed down such that the entire formation of silica capsule takes no less than about 12 hours, no less than about 16 hours, no less than about 20 hours, no less than about 24 hours, no less than about 28 hours, no less than about 32 hours, no less than about 36 hours, no less than about 40 hours, no less than about 44 hours or no less than about 48 hours (e.g. 2 days).

In various embodiments, regulating the relative rates of hydrolysis and condensation comprises enhancing/increasing/catalysing the rate of condensation. In various embodiments, enhancing/increasing/catalysing the rate of condensation enhances/increases silica growth on the emulsified droplet leading to the formation of stronger silica capsule walls.

Without being bound by theory, is it believed that the presence of both alcohol and salts (or ionic strength) may influence the relative rates of hydrolysis and condensation by (i) slowing down the hydrolysis process specifically because of/through ion association (the salt effect amplified by the alcohol effect); and (ii) catalyzing the condensation step specifically because of/through ion association (the salt effect amplified by the alcohol effect). This is beneficial because when hydrolysis is slowed down, bigger oligomers may be formed before condensation (with double catalysis effect) takes place, thereby creating stronger silica shells resulting in a more robust silica capsule formation.

In various embodiments, the amplification of salt effect and ethanol effect works hand in hand to yield superior capsules. Such improved capsules are advantageous as they overcome or reduce the general issues of capsule breakage in applications where robust capsules are needed. In one example, robust capsules were formed when both salt and alcohol were present. In various embodiments, it was found that the components individually (i.e. salt only or alcohol only) do not aid in the formation of robust capsules.

In various embodiments therefore, there is provided a method of producing silica capsules, the method comprising: adding a silica precursor to emulsified droplets in the presence of salt and alcohol to enhance silica growth around the emulsified droplets by an ion association effect, thereby forming silica capsules. In various embodiments, the method produces silica capsules having strengthened shells. The strengthened shells may be more resistant to stress as compared to the shells of capsules produced by a method devoid of the combined use of salt and alcohol. For example, the strengthened shells may be more resistant to stress as compared to the shells of capsules produced by a method using salt without alcohol or using alcohol without salt or not using both alcohol and salt.

In various embodiments, the salt comprises an inorganic salt. In some embodiments, the inorganic salt comprises a metal salt. The salt may be a monovalent salt, a multivalent salt or a combination of both. In some embodiments, the salt comprises a sodium salt, a potassium salt, a calcium salt, an aluminium salt and the like and combinations thereof. In some embodiments, the salt comprises sodium chloride, potassium chloride, calcium chloride, aluminium chloride or combinations thereof. In some embodiments, where the application involves coating on cements, the salt is a calcium salt. Advantageously, calcium salts such as calcium chloride may be especially useful for coating on cements as compared to sodium salts. Depending on the specific application, some salts may perform better than other salts. Accordingly, other suitable salts capable of altering an ionic strength to provide the desired ion association effect may also be used for embodiments of the method disclosed herein. In some embodiments, the ionic strength of the medium contributes to the efficacy of the method and/or the robustness of the capsules disclosed herein.

In various embodiments, the salt is present at a concentration of at least about 10 mM, at least about 11 mM, at least about 12 mM, at least about 13 mM, at least about 14 mM, at least about 15 mM, at least about 16 mM, at least about 17 mM, at least about 18 mM, at least about 19 mM or at least about 20 mM. In various embodiments, the salt is present at a concentration of from about 10 mM to about 20 mM, from about 12 mM to about 18 mM or from about 14 mM to about 16 mM. In one embodiment, the salt is present at a concentration of about 15 mM.

In various embodiments, the alcohol is selected from the group consisting of: methanol, ethanol, propanol, isopropanol and the like and combinations thereof. The type of alcohol that may be suitably used may depend on the type of silica precursor used.

In various embodiments, the co-solvent or the alcohol is present at a concentration of at least about 15%, at least about 16%, at least about 17%, at least about 18%, at least about 19%, at least about 20%, at least about 21%, at least about 22%, at least about 23%, at least about 24%, at least about 25%, of at least about 26%, at least about 27%, of at least about 28%, at least about 29% or at least about 30% v/v (volume/volume). In some embodiments, the co-solvent or the alcohol is present at a concentration of at least about 20% v/v. In some embodiments, the co-solvent or the alcohol is present at a concentration of from about 20% to about 30% v/v, from about 23% to about 28% v/v, or from about 25% to about 27% v/v. In one embodiment, the co-solvent or the alcohol is present at a concentration of about 25% v/v. In one embodiment, the co-solvent or the alcohol is present at a concentration of about 26% v/v. In some embodiments, the concentration of the co-solvent or the alcohol is not so high such that any hydrophobic active material present becomes partially soluble.

In various embodiments, the step of regulating the relative rates of hydrolysis and condensation of a silica precursor on an emulsified droplet comprises providing an acidic environment when hydrolysing and/or condensing the silica precursor on the emulsified droplets. In various embodiments, the step of adding a silica precursor to emulsified droplets is carried out in an acidic pH environment. In various embodiments, the acidic pH environment comprises a pH of no more than about 7, no more than about 6, no more than about 5, no more than about 4.9, no more than about 4.8, no more than about 4.7, no more than about 4.6, no more than about 4.5, no more than about 4.4, no more than about 4.3, no more than about 4.2, no more than about 4.1, no more than about 4.0, no more than about 3.9, no more than about 3.8, no more than about 3.7, no more than about 3.6, no more than about 3.5, no more than about 3.4, no more than about 3.3, no more than about 3.2, no more than about 3.1, no more than about 3.0, no more than about 2.9, no more than about 2.8, no more than about 2.7, no more than about 2.6 or no more than about 2.5. In some embodiments, the acidic pH is from about pH 2 to about pH 5, from about pH 2.5 to about pH 4.5, from about pH 2.8 to about pH 4.5, from about pH 2.8 to about pH 3.5 or from about pH 3.0 to about pH 3.2. In one embodiment, the acidic pH is about pH 3.0. In one embodiment, the acidic pH is about pH 3.1.

In one embodiment, an acid is provided to establish the acidic pH environment. In some embodiments, the acid comprises an inorganic acid. In some embodiments, the acid comprises a strong acid. In various embodiments, the acid is selected from the group consisting of hydrochloric acid, sulfuric acid, phosphoric acid, nitric acid and combinations thereof. In one embodiment, the acid comprises hydrochloric acid.

In various embodiments, the silica precursor comprises a tetraalkyl orthosilicate, a trialkoxyalkylsilane or a silicon alkoxide (alkoxy silane). In various embodiments, the silica precursor is selected from the group consisting of tetramethyl orthosilicate (TMOS), tetraethyl orthosilicate (TEOS), tetrapropyl orthosilicate (TPOS), methyltrimethoxysilane (MTMS), methyltriethoxysilane (MTES) and the like and combinations thereof. In some embodiments, the silica precursor comprises an alkoxy silane. In one embodiment, the alkoxy silane comprises TEOS.

In various embodiments, the amount of silica precursor added/infused is from about 1% to about 20% v/v, from about 5% to about 20% v/v or from about 8% to about 16% v/v. In various embodiments, the amount of silica precursor added is about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, or about 20% v/v. The silica precursor may be added by way of a continuous flow or a pulsed flow e.g. by use of a syringe pump. In various embodiments, the silica precursor is delivered at a rate of about 0.1 mL/min, about 0.2 mL/min, about 0.3 mL/min, about 0.4 mL/min, about 0.5 mL/min, about 0.6 mL/min, about 0.7 mL/min, about 0.8 mL/min, about 0.9 mL/min, about 1 mL/min, about 2 mL/min, about 3 mL/min, about 4 mL/min, about 5 mL/min, about 6 mL/min, about 7 mL/min, about 8 mL/min, about 9 mL/min, about 10 mL/min, about 0.1 mL/hr, about 0.2 mL/hr, about 0.3 mL/hr, about 0.4 mL/hr, about 0.5 mL/hr, about 0.6 mL/hr, about 0.7 mL/hr, about 0.8 mL/hr, about 0.9 mL/hr or about 1 mL/hr.

In various embodiments, the emulsified droplets are substantially non-polar. In various embodiments, the emulsified droplets are substantially hydrophobic.

In various embodiments, the method further comprises a step of emulsifying an oil, an organic solvent, a non-polar substance/solvent, an active or combinations thereof to form the emulsified droplets prior to the regulating or adding step. In various embodiments, the emulsifying step comprises providing a first phase comprising the oil, the organic solvent, the non-polar substance/solvent, the active or combinations thereof, and a second phase that is immiscible with the first phase. In some embodiments, the first phase comprises an oil phase, an organic phase or a non-polar phase and the second phase comprises an aqueous phase or a polar phase. In some embodiments, the first phase comprises an aqueous phase or a polar phase and the second phase comprises an oil phase or an organic phase or a non-polar phase.

A surfactant may be provided during the emulsifying step to homogenize the first phase with the second phase. For example, a neutral surfactant such as one containing sugar-based or polyethylene glycol-based hydrophilic groups may be provided. In one embodiment, Triton X-100 is provided as a surfactant. In one embodiment, cetrimonium bromide (CTAB) is provided as a surfactant. It will be appreciated that other suitable surfactants in appropriate amounts/concentrations may also be used to produce surfactant-stabilised microspheres.

A stabiliser (that is not the surfactant) may also be added during the emulsifying step to homogenize the first phase with the second phase. In one embodiment, poly vinyl alcohol is provided as a stabiliser. It will be appreciated that other suitable stabilisers may also be used.

In various embodiments, the emulsifying step is carried out under high pressure. In some embodiments, the emulsifying step comprises passing a mixture of the first phase and the second phase through a homogeniser, optionally a high pressure homogeniser, one or more times until a desirable size of the emulsified droplets is obtained. Prior to the passing step, the mixture of the first phase and the second phase may be subjected to mechanical and/or high shear mixing. In some embodiments, the mixture is subjected to stirring at a speed of at least about 400 rpm, at least about 500 rpm, at least about 600 rpm, at least about 700 rpm, at least about 800 rpm, at least about 900 rpm, at least about 1000 rpm, at least about 2000 rpm, at least about 3000 rpm, at least about 4000 rpm, at least about 5000 rpm, at least about 6000 rpm or at least about 7000 rpm. In various embodiments, the mixture is subjected to stirring until a desirable size of the emulsified droplets is obtained. In various embodiments, the mixture is subjected to stirring for at least about 1 h, at least about 1.5 h, at least about 2 h, at least about 2.5 h, at least about 3 h, at least about 3.5 h, at least about 4 h, at least about 4.5 h or at least about 5 h to obtain the desirable size of the emulsified droplets. Advantageously, embodiments of the method produce a uniform emulsion of a template or a material to be encapsulated. In various embodiments therefore, the emulsified droplets are provided in the form of a stable emulsion of droplets.

In various embodiments, the oil, the organic solvent, the non-polar substance/solvent or the active is substantially non-polar and/or substantially hydrophobic. In some embodiments, the oil, the organic solvent, the non-polar substance/solvent or the active is substantially soluble/miscible with the first phase comprising an oil phase or organic phase or non-polar phase.

In various embodiments, the method comprises dispersing a substantially non-polar substance in a polar solvent to obtain the emulsified droplets.

In various embodiments, the oil, the organic solvent, the non-polar substance/solvent or the active does not comprise a substance that has partial or full solubility in a water-alcohol system such as a water-ethanol system or a water-isopropanol-ethanol system. In various embodiments, the non-polar substance, the oil, the organic solvent, the non-polar substance/solvent, or the active comprises a substance selected from the group consisting of: aroma, flavour, fragrance, perfume, drug, therapeutic, phase change material (PCM) e.g. CrodaTherm 29, cosmetic, skin care substance, waxy material, waxy solid, polymer, solid polymer, liquid polymer, waxy polymer, polymer with broad polydisperse molecular weight dispersion, polydisperse polymeric core material, silicone oil, polydimethylsiloxane (PDMS) silicone oil, low-boiling organic solvent, pentane, dodecane or combinations or mixtures thereof.

In some embodiments, the polar phase comprises a water-alcohol mixture. In one embodiment, the water-alcohol mixture comprises a water-ethanol mixture. In one embodiment, the water-alcohol mixture comprises a water-isopropanol-ethanol mixture. In some embodiments, the method is carried out using water as the primary medium. The water may be deionized water. In some embodiments, water is the primary medium and the only other main additive that is used is alcohol. In some embodiments, the alcohol is non-toxic and approved for clinical use. Advantageously, embodiments of the method do not require expensive agents and are environmentally friendly.

In various embodiments, the ratio of the first phase comprising an oil phase or organic phase or non-polar phase to the second phase comprising an aqueous phase or polar phase is from about 1:99 to about 50:50 by concentration/volume. In various embodiments, the appropriate range of volume of the first phase comprising an oil phase or organic phase or non-polar phase to the volume of the second phase comprising an aqueous phase or polar phase (i.e. the volume ratio) is inversely related to one or more of the following: the viscosity of the first phase, the hydrophobicity of the first phase, the efficiency of the surfactant and the desirable size of the emulsified droplets. Where a stabiliser is used, the combined viscosity of the first phase with the stabiliser and the combined hydrophobicity of the first phase with the stabiliser may be considered. In one embodiment, the volume ratio of the first phase comprising an oil phase or organic phase or non-polar phase to the second phase comprising an aqueous phase or polar phase is no more than about 50:50 such that gel formation is avoided. In some embodiments, the volume ratio of the first phase comprising an oil phase or organic phase or non-polar phase to the second phase comprising an aqueous phase or polar phase is from about 1:99 to about 15:85 (or 1-15% v/v dispersion of first phase in second phase) when the desirable size of the emulsified droplets is about 5 µm or less. In some embodiments, the volume ratio of the first phase comprising an oil phase or organic phase or non-polar phase to the second phase comprising an aqueous phase or polar phase is from about 15:85 to about 50:50 (or 15-50% v/v dispersion of first phase in second phase) when the desirable size of the emulsified droplets is about 5 μm or more, or from about 5 μm to about 80 μm. Advantageously, by varying a ratio of the first phase to the second phase (in addition to varying a number of passes through a homogeniser), the size of the emulsified droplets acting as the template may be controlled and hence the size of the silica capsules may also be easily tuned.

In various embodiments, the method further comprises evaporating the emulsified droplets encapsulated by the silica capsules to obtain hollow silica capsules after the regulating step or adding step. In some embodiments, the emulsified droplets are evaporated by maintaining the silica capsules in water exposed to atmosphere. In some embodiments, the evaporating step is carried out at room/ambient temperature. Depending on the nature of the emulsified droplets, elevated temperatures or calcination although optional, may also be employed to facilitate the evaporation process.

In some embodiments, pentane which is a low boiling organic solvent is used as a template (i.e. pentane is used to produce the emulsified droplets) to produce hollow silica capsules. By leaving the capsules encapsulating pentane for an amount of time in water exposed to atmosphere, the pentane may be evaporated to leave behind hollow silica capsules. The silica capsule may then be isolated and dried.

In some embodiments, where the emulsified droplets comprise a waxy material such as a phase change material, the method is carried out at the melting temperature of the waxy material or at a temperature that is no more than about 10° C. or no more than about 5° C. from the melting temperature. Advantageously, embodiments of the method can be suitably performed at a temperature that is or close to the melting temperature of a waxy solid, thereby enabling high loading of the waxy solid within the silica capsules.

In some embodiments, the method is devoid of a template removal step comprising calcination. In some embodiments, the method is carried out at a temperature of no more than about 60° C. In some embodiments, the method, including any template removal step, is carried out at a temperature of no more than about 60° C., no more than about 50° C., no more than about 45° C., no more than about 40° C., no more than about 35° C. or no more than about 30° C. In some embodiments, the method is carried out at ambient/room temperature. In some embodiments, the method is carried out at ambient pressure. Advantageously, embodiments of the method do not require high temperature or pressure and are therefore energy-saving and cost-effective. Embodiments of the method may also be suitably used for encapsulating a large variety of materials, including temperature-sensitive materials and low temperature phase change materials.

In various embodiments, the method further comprises a step of concentrating the silica capsules. In various embodiments, the concentrating step comprises removing at least a portion of any water/solvent and/or co-solvent/alcohol surrounding the silica capsules. In various embodiments, the concentrating step does not substantially change the ratio of silica to the substance encapsulated by the capsules. In various embodiments, the concentrating step does not result in substantial leakage from the capsules. Advantageously, embodiments of the silica capsules are able to withstand a concentrating procedure without breakage.

In some embodiments, the method comprises concentrating the silica capsules to an amount of about 25%, about 26%, about 27%, about 28%, about 29%, about 30%, about 31%, about 32%, about 33%, about 34%, about 35%, about 36% or about 37% in water. In some embodiments, the silica capsule is capable of being concentrated in water to a concentration of at least about 25%, about 26%, about 27%, about 28%, about 29%, about 30%, about 31%, about 32%, about 33%, about 34%, about 35%, about 36% or about 37% without substantial breakage. The percentage concentration may be in terms of the weight of the silica capsules and/or weight of any encapsulated content/volume of water (wt/v %).

In various embodiments, the method further comprises a step of collecting the silica capsules. In various embodiments, the method further comprises a step of drying the silica capsules. In various embodiments, the silica capsules are dried, e.g. in a ventilated oven, at a temperature of about 40° C., about 45° C., about 50° C., about 55° C. or about 60° C. Post treatment steps such as purification and separation may also be carried out. In various embodiments, the silica capsules are separated by filtration under vacuum. In various embodiments, the silica capsules are washed or rinsed with water, e.g. fresh warm water, one or more times. Given that embodiments of the method use a small number of reagents, all of which are non-toxic, embodiments of the method require fewer purification and/or separation steps as compared to conventional methods of synthesising silica capsules. Further, embodiments of the method also have greater material efficiency.

In one embodiment, the method is carried out in a reactor.

In various embodiments, the yield of the silica capsules (by a solid content) is at least about 80%, at least about 81%, at least about 82%, at least about 83%, at least about 84%, at least about 85%, at least about 86%, at least about 87%, at least about 88%, at least about 89%, at least about 90%, at least about 91%, at least about 92%, at least about 93%, at least about 94% or at least about 95%.

Embodiments of the method are easy to perform and may be carried out as a one-step direct synthesis method/one pot synthesis method. Embodiments of the method are also environmentally benign, and has substantially high reproducibility and/or scalability (good control of size) attributed in part to the robust shells that are produced.

Embodiments of the method are capable of producing a silica capsule having a size/diameter/particle size/particle size distribution/average particle size in the range of from about 100 nm to about 100 μm, from about 500 nm to about 100 μm, from about 1 μm to about 100 μm, from about 100 nm to about 80 μm, from about 1 μm to about 80 μm, from about 1 μm to about 60 μm, from about 1 μm to about 50 μm, from about 1 μm to about 40 μm, from about 1 μm to about 30 μm, from about 1 μm to about 20 μm, from about 1 μm to about 10 μm, from about 1 μm to about 8 μm, from about 8 μm to about 50 μm, from about 8 μm to about 40 μm, from about 8 μm to about 30 μm, from about 8 μm to about 20 μm, from about 8 μm to about 10 μm, no less than about 8 μm, no less than about 9 μm, or no less than about 10 μm, no less than about 20 μm, no less than about 30 μm, no less than about 40 μm or no less than about 50 μm. In some embodiments, the silica capsule is micron-sized. In some embodiments, the silica capsule is submicron-sized. In some embodiments, the silica capsule is nano-sized. In some embodiments, the silica capsule is no more than about 100 μm. In some embodiments, the silica capsule is no less than about 100 nm, or 0.1 μm.

The silica capsule obtained/produced by the embodiments of the method may remain substantially intact under one of more of mechanical stress, high shear, high temperature, repeated heating and cooling, high shear mixing and large scale mixing. This is particularly relevant for coating applications, where capsules encapsulating e.g. waxy materials, low temperature phase change materials etc. are required to undergo repeated heating and cooling cycles and high shear mixing. This is also particularly relevant for temperature sink applications, where capsules encapsulating e.g. solid polymeric materials are required to withstand large thermal energy changes.

In some embodiments, the silica capsule may remain substantially intact under high vacuum, e.g. during SEM analysis. In some embodiments, the silica capsule remains substantially intact under one or more of heating, applying vacuum at about 50° C. or concentrating up to at least about 37% by weight in a suspension. In some embodiments, the silica capsule is substantially devoid of ruptures and/or leakages when observed by a SEM under ×1000 magnification. In some embodiments, the silica capsule is capable of being subjected to SEM vacuum conditions without substantial breakage. Advantageously, embodiments of the silica capsule are robust and substantially resistant to breakage or rupture when subjected to harsh treatments.

In some embodiments therefore, the silica capsule is no more than about 100 microns in size and is substantially resistant to breaking under scanning electron microscopy (SEM) vacuum conditions.

In various embodiments, the silica capsule encapsulates an oil or an active selected from the group consisting of: aroma, flavour, fragrance, perfume, drug, therapeutic, phase change material (PCM) e.g. CrodaTherm 29, cosmetic, skin care substance, waxy material, waxy solid, polymer, solid polymer, liquid polymer, waxy polymer, polymer with broad polydisperse molecular weight dispersion, polydisperse polymeric core material, silicone oil, PDMS silicone oil, low-boiling organic solvent, pentane, dodecane and combinations and mixtures thereof. In various embodiments, the oil or active encapsulated comprises a substantially non-polar substance. In some embodiments, the silica capsule comprises a substantially non-polar substance encapsulated by the silica capsule. In various embodiments, the substantially non-polar substance is selected from the group consisting of: aroma, flavour, fragrance, perfume, drug, therapeutic, phase change material, cosmetic, skin care substance, silicone oil, pentane, dodecane or combinations thereof.

In various embodiments, the silica capsule has a high carrying capacity of at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 81%, at least about 82%, at least about 83%, at least about 84%, at least about 85%, at least about 86%, at least about 87%, at least about 88%, at least about 89% or at least about 90% for the oil or active. In some embodiments, the silica capsule has a high carrying capacity of at least about 80%. The percentage concentration may be in terms of the weight of the oil or active/volume of water or solvent (wt/v %). In some embodiments, the silica capsule, when loaded with cargo, has a high solid content with the silica shell making up about 5% to about 30% or about 10% to about 20% of the total weight of the loaded silica capsule. In some embodiments, the silica capsule is capable of being loaded with cargo of at least about 80% by weight of the loaded silica capsule without substantial breakage.

In some embodiments, the silica capsule comprises a mesoporous silica capsule. In some embodiments, the silica capsule is capable of a slow release or a controlled release of its encapsulated/loaded contents e.g. an emulsified droplet, a non-polar substance, an oil or an active. This is useful in applications where a slow, controlled release is desired, as opposed to a burst release. For example, flavours encapsulated by embodiments of the silica capsules may be slowly released through the nano pores of the silica shell.

In some embodiments, the silica capsule comprises a silica shell that is not coated with a second non-silica layer/shell (e.g. a polymer layer/shell) or with a silica-polymer hybrid shell. In some embodiments, the silica shell does not comprise more than one distinct layer i.e. the silica shell may contain only one single silica layer. In some embodiments, the silica shell is substantially homogenous. In some embodiments, the silica shell consists of silicon oxide.

In some embodiments, the silica capsule is substantially hollow. The hollow silica capsule may be a dried hollow silica capsule. The hollow silica capsule may also be in solid powder form. The hollow silica capsules may be capable of being filled with a cargo such as an active.

In various embodiments, the silica capsule has one or more of the following properties: non-toxic, hypoallergenic, biocompatible, degradable, environmentally benign, chemically stable and physically stable.

In various embodiments, the silica capsule is stable under ambient conditions for no less than about 6 months, no less than about 7 months, no less than about 8 months, no less than about 9 months, no less than about 10 months, no less than about 11 months, or no less than about 12 months. In various embodiments, the silica capsule does not break or rupture under storage for no less than about 6 months, no less than about 7 months, no less than about 8 months, no less than about 9 months, no less than about 10 months, no less than about 11 months, or no less than about 12 months. In some embodiments, the silica capsule is stable under ambient conditions for no less than about 6 months without substantial breakage.

In some embodiments therefore, the silica capsule has one or more of the following properties: (i) capable of being loaded with cargo of at least about 80% by weight of the loaded silica capsule without substantial breakage; (ii) capable of being concentrated in water to a concentration of at least about 30 wt % without substantial breakage, (iii) capable of being subjected to scanning electron microscopy (SEM) vacuum conditions without substantial breakage, and (iv) is stable under ambient conditions for no less than about 6 months without substantial breakage.

Embodiments of the method are capable of producing a stable silica capsule/a stable colloidal formulation. In various embodiments, the silica capsule is in a stable colloidal formulation. The colloidal formulation may be stable at least under ambient conditions for no less than about 6 months, no less than about 7 months, no less than about 8 months, no less than about 9 months, no less than about 10 months, no less than about 11 months, or for no less than about 12 months. The colloidal formulation may be substantially monodisperse. In various embodiments, the silica capsules are substantially uniform in shape. In various embodiments, the silica capsules are substantially spherical in shape. In various embodiments, the concentration of the silica capsules are at least about 10 wt %, at least about 20 wt %, at least about 30 wt %, at least about 31 wt %, at least about 32 wt %, at least about 33 wt %, at least about 34 wt %, at least about 35 wt %, at least about 36 wt %, at least about 37 wt %, at least about 38 wt %, at least about 39 wt %, at least about 40 wt %, at least about 50 wt %, at least about 60 wt % or at least about 70 wt % in the colloidal formulation. When the silica capsules are concentrated, the individual particles may aggregate. In various embodiments, the particles can be dispersed after aggregation, without substantial breakage of the particles. In some embodiments, the silica capsules coalesce to form cauliflower-like structures at concentrations of about 60 wt % or more.

Embodiments of the method, silica capsule or colloidal formulation are suitable for use in various applications including but not limited to coating, therapy, agriculture, catalyst, printing, film, fiber, cosmetics, consumer care, personal care, health care and temperature sink application. For example, a coating for high heat surfaces may suitably employ embodiments of the silica capsules.

In various embodiments, there is provided a method, a silica capsule or a colloidal formulation as described herein.

EXAMPLES

Example embodiments of the disclosure will be better understood and readily apparent to one of ordinary skill in the art from the following discussions and if applicable, in conjunction with the figures. It should be appreciated that other modifications related to structural, physical and chemical changes may be made without deviating from the scope of the invention. Example embodiments are not necessarily mutually exclusive as some may be combined with one or more embodiments to form new example embodiments.

Materials and Methods

Hydrochloric acid (HCl, fuming, 37%) was purchased from Merck. Ethanol and isopropanol were purchased from VWR Chemicals. Sodium chloride (97%) and Triton X-100 were purchased from Sigma-Aldrich. Tetraethyl orthosilicate (TEOS, 98%) was purchased from Hubei Co-Formula Material Tech Co., Ltd. All reagents were used as received without purification. Deionized water was obtained from an aquaMAX™-Basic 321 DI water purification system.

Unless otherwise stated, all reactions were conducted at ambient conditions of temperature and pressure. An exception is Example 4 pertaining to the encapsulation of a phase change material, CrodaTherm 29, which was melted at 40° C. prior to encapsulation and kept in liquid state for encapsulation at 40° C.

Example 1: High Fragility of Conventional Silica Capsules

Silica capsules were made following the method described in US 2014/0044760 A1. Briefly, the method involves emulsifying an active in water by use of mechanical stirring in the presence of a surfactant. Then, a silica precursor was introduced and allowed to undergo hydrolysis condensation reaction on the surface of the emulsified droplet to produce a silica capsule. In this example, silicone oil was used as the template and tetraethyl orthosilicate (TEOS) was used as the silica precursor.

Figure 1:
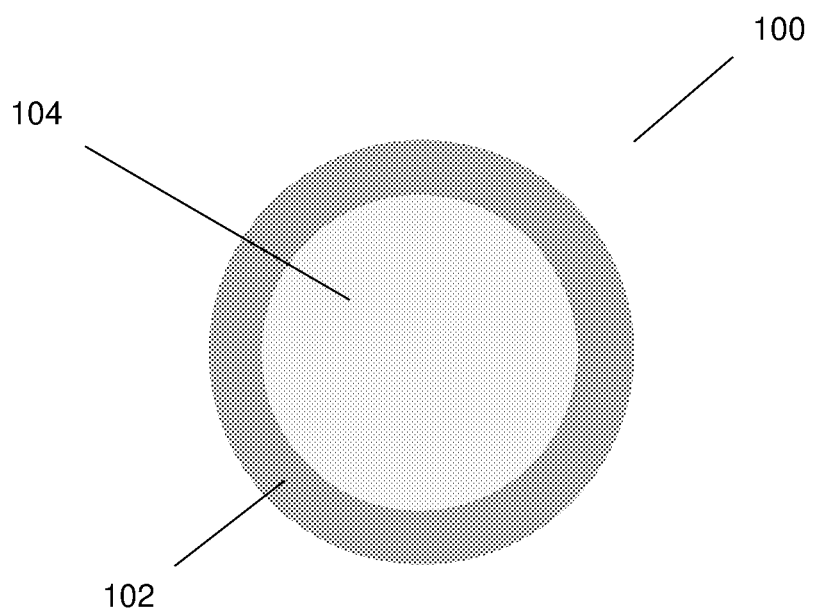
FIG. 1 is a schematic diagram of a silica capsule in accordance with various embodiments disclosed herein. The silica capsule 100 comprises a silica shell 102 encapsulating a hollow or loaded core 104 in accordance with various embodiments disclosed herein.
Figure 2A:
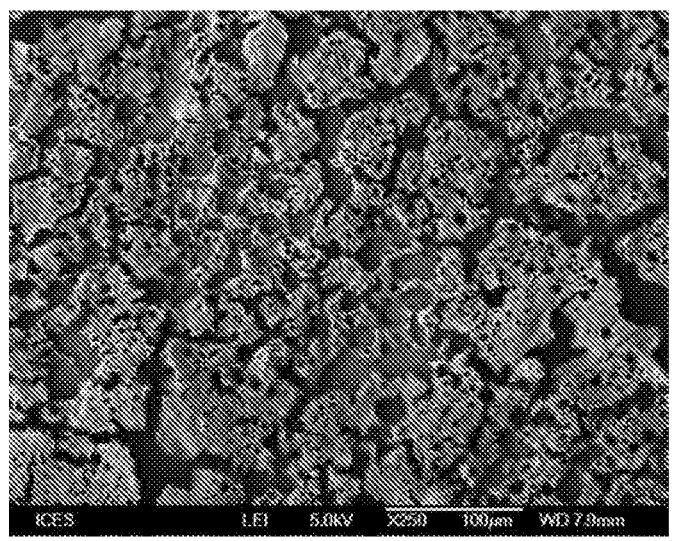
FIG. 2 shows the product obtained from a conventional silica capsule synthesis method. (A) is a SEM image showing silica films being observed at ×250 magnification due to capsules breakage. (B) is a SEM image showing a ruptured capsule at ×5,000 magnification.
Figure 2B:
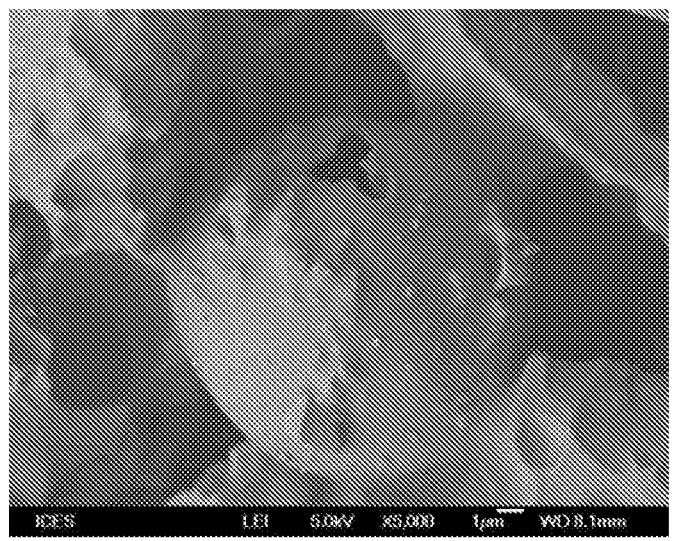

The silica capsules were not able to withstand the vacuum condition employed in scanning electron microscopy (SEM) imaging. These was breakage of the polymer capsules (see FIG. 2B) leading to silica films being observed (see FIG. 2A).

Silica capsules produced by conventional methods, such as those described in US 2014/0044760 A1 are thus fragile and break easily under the vacuum conditions used for SEM imaging.

Example 2: Production of Robust Capsules Encapsulating Silicon Oil

NaCl (15 mM) and Triton X (18.9 mmol) were dissolved in 800 ml of ethanol (26 vol %) and water (74 vol %) solvent mixture. After that, silicon oil (14.3 vol %) was added to the mixture and stirred with ultra-turrax (4000 rpm) till homogenous. Subsequently, a uniform pre-emulsion was obtained by passing the mixture through a high pressure homogenizer (500 bar, 3 cycles). The particle size was monitored by light microscopy.

The mixture was then transferred to a 1 L reactor and stirred at 600 rpm. After that, TEOS (8.62 vol %) was added via syringe pump over a period of 30 mins. The reaction mixture was stirred for another 4 days at room temperature, yielding 92% (based on solid content) white slurry.

Figure 3A:
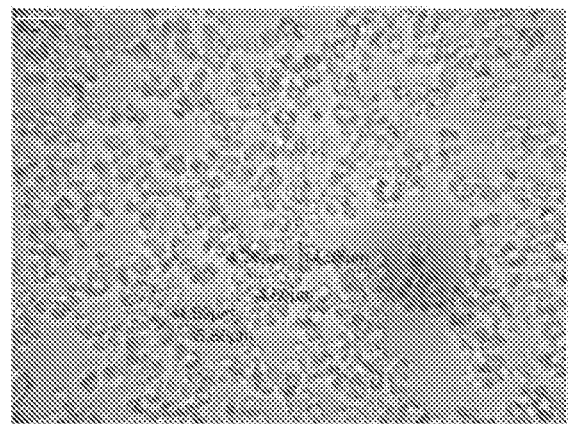
FIG. 3 shows the silica capsules, encapsulating silicone oil, produced from a method in accordance with an example embodiment disclosed herein. (A) is a light microscopy image showing the micro capsules product at ×10 magnification. (B) is a SEM image showing the spherical structures of the micro capsules at a low ×250 magnification. (C) is a SEM image showing the micro capsules having intact, unruptured walls at high ×1,000 magnification.
Figure 3B:
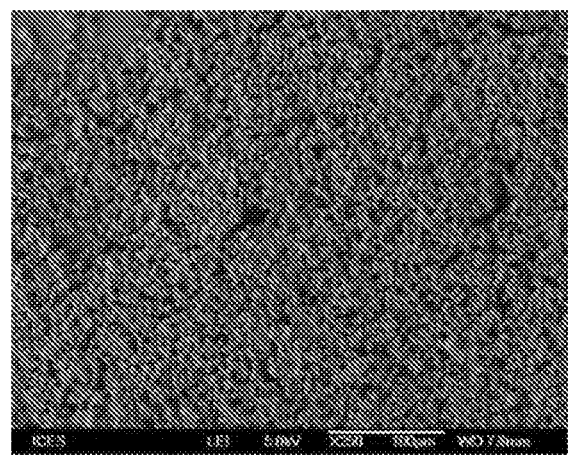
Figure 3C:
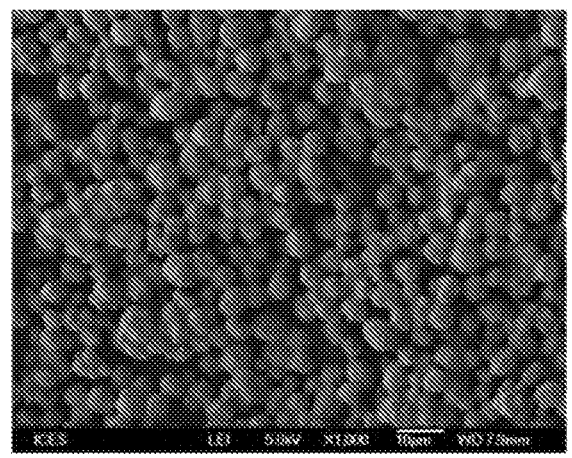

As shown in FIGS. 3A-C, silica capsules having intact, unruptured walls were obtained.

Figure 4:
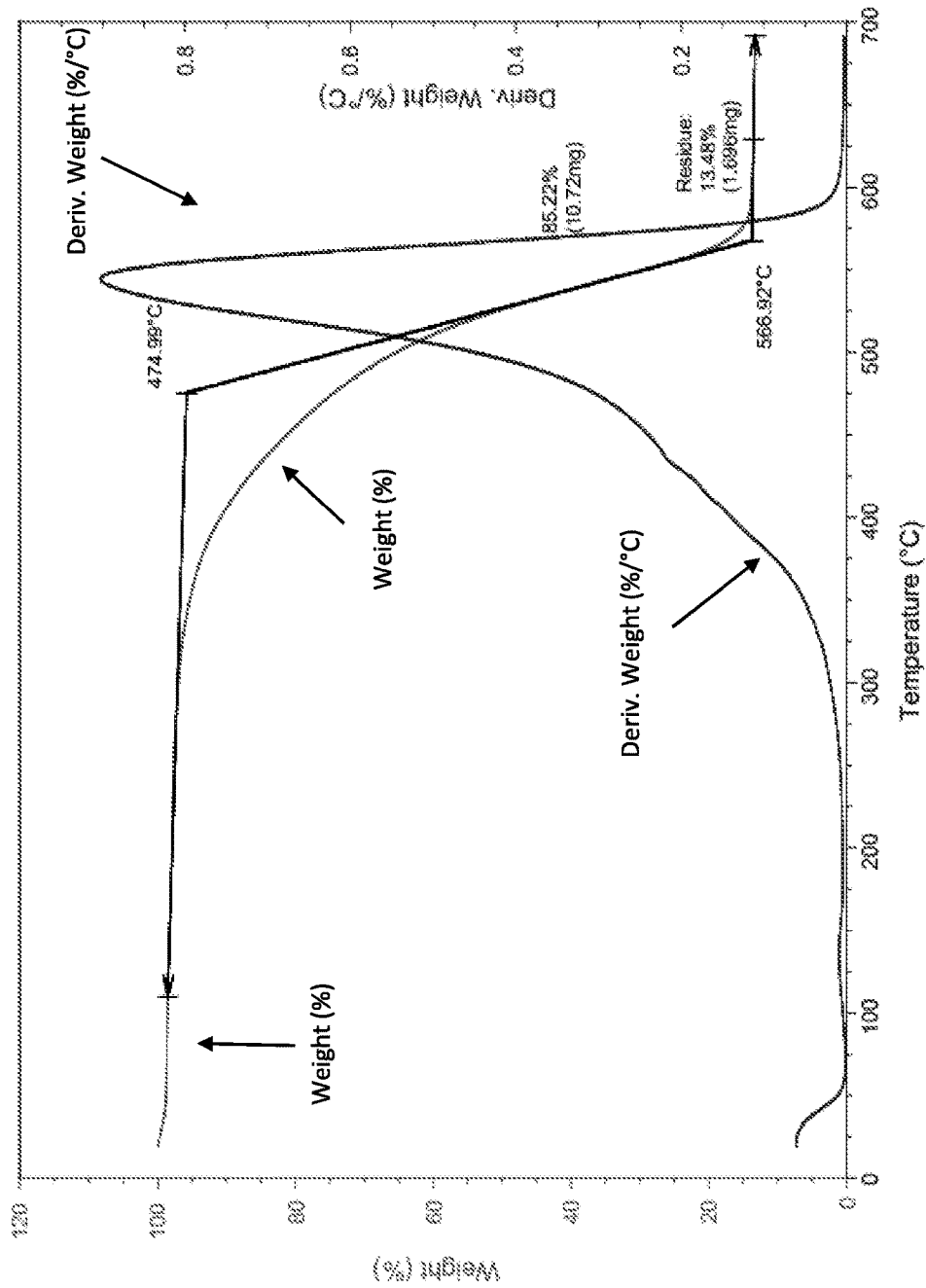
FIG. 4 is a thermogravimetric analysis graph of the silica capsules encapsulating silicone oil produced from a method in accordance with an example embodiment disclosed herein. The content of the silicone oil was determined to be about 85%, and the content of silicon oxide ($SiO_2$) was determined to be about 13%.

The content of the silicone oil was determined to be about 85%, and the content of silicon oxide ($SiO_2$) was determined to be about 13% from a thermogravimetric analysis (see FIG. 4).

Example 3: Production of Robust Capsules Encapsulating Dodecane

NaCl (0.08 g, 1.369 mmol), Triton X (7.5 g, 0.012 mol) and CTAB (0.22 g, 0.604 mmol) were dissolved in ethanol (9.98 g) and water (62.3 g) solvent mixture. After that, dodecane (20 g, 20 vol %) was added to the mixture and stirred with ultra-turrax (6000 rpm) till homogenous. The particle size was monitored by light microscopy. Emulsion size of 5-10 μm was achieved.

The mixture was stirred continuously at 600 rpm for an hour using an overhead stirrer. After that, TEOS (16 g) was added via syringe pump at 0.5 ml/hr with continuous stirring at 600 rpm. The reaction mixture was stirred for another 4 days at room temperature.

Figure 5A:
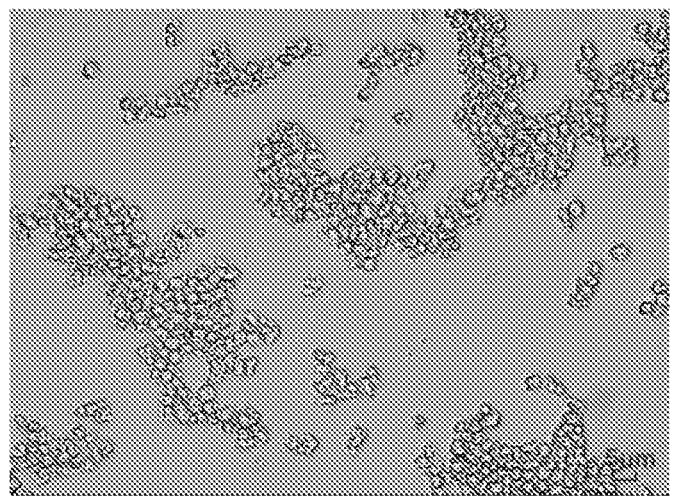
FIG. 5 shows the silica capsules, encapsulating dodecane, produced from a method in accordance with an example embodiment disclosed herein. (A) shows the micro silica capsules under bright field microscopy. (B) shows the micro silica capsules under SEM imaging at ×1,000 magnification.
Figure 5B:
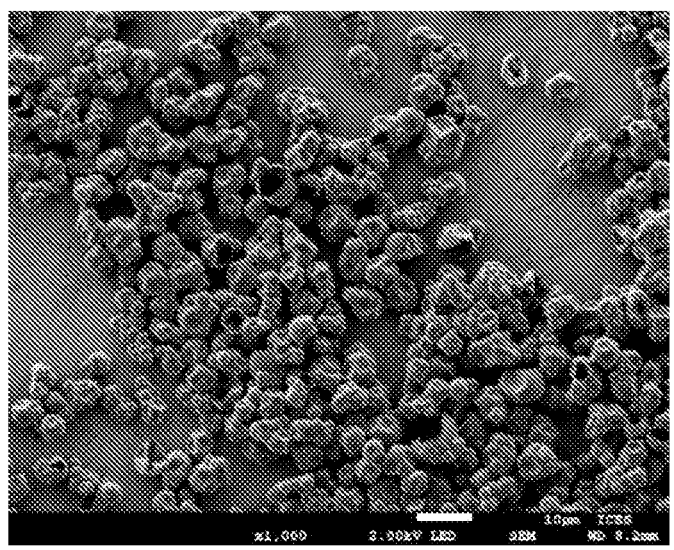

The dodecane-containing microcapsules obtained showed minimal breakage, thus demonstrating the robustness of the shells (see FIGS. 5A and 5B). Interestingly, under SEM observation, the microcapsules show a squished geometry (see FIG. 5B), possibly due to the escape of some of the active.

Example 4: Production of Robust Capsules Encapsulating CrodaTherm 29

Sodium chloride (700 mg) and Triton X-100 (18.297 g) were first dissolved in a medium (800 mL) prepared from an alcohol mixture (95% ethanol and 5% isopropanol v/v) and water in a 1:3 volume ratio. The prepared medium was then heated at 40° C. CrodaTherm 29 (102.12 g) was added to the warm medium and allowed to melt. The resultant mixture was stirred at 710 rpm with a dispersing disc blade rotor to form an emulsion of CrodaTherm 29. Once the preliminary emulsion was formed, 1 M HCl solution was used to adjust the pH to 3. The emulsion was left stirring until the droplet size was reduced to the targeted range (5-20 μm), which usually takes about 2.5 h. TEOS (69 mL) was then infused into the emulsion at 0.4 mL/min.

The encapsulation process was carried out for a minimum of three days, during which the shell growth and emulsion stability were monitored continuously. Upon completion, the capsules were separated by filtration under vacuum and washed multiple times using fresh warm water. More specifically, the silica capsules were allowed to stand for 2-3 hours after synthesis to allow the capsules to cream to the top of the slurry. The removal of clear aqueous phase and repeating the process 2-3 times (topping up the removed water and allowing to stand and separating the clear part) finally provided a concentrated slurry free of ethanol. The capsules were stored either in a suspension/slurry form or in a dry form. If storing in a dry form, the capsules were dried in a ventilated oven at 50° C.

Figure 6A:
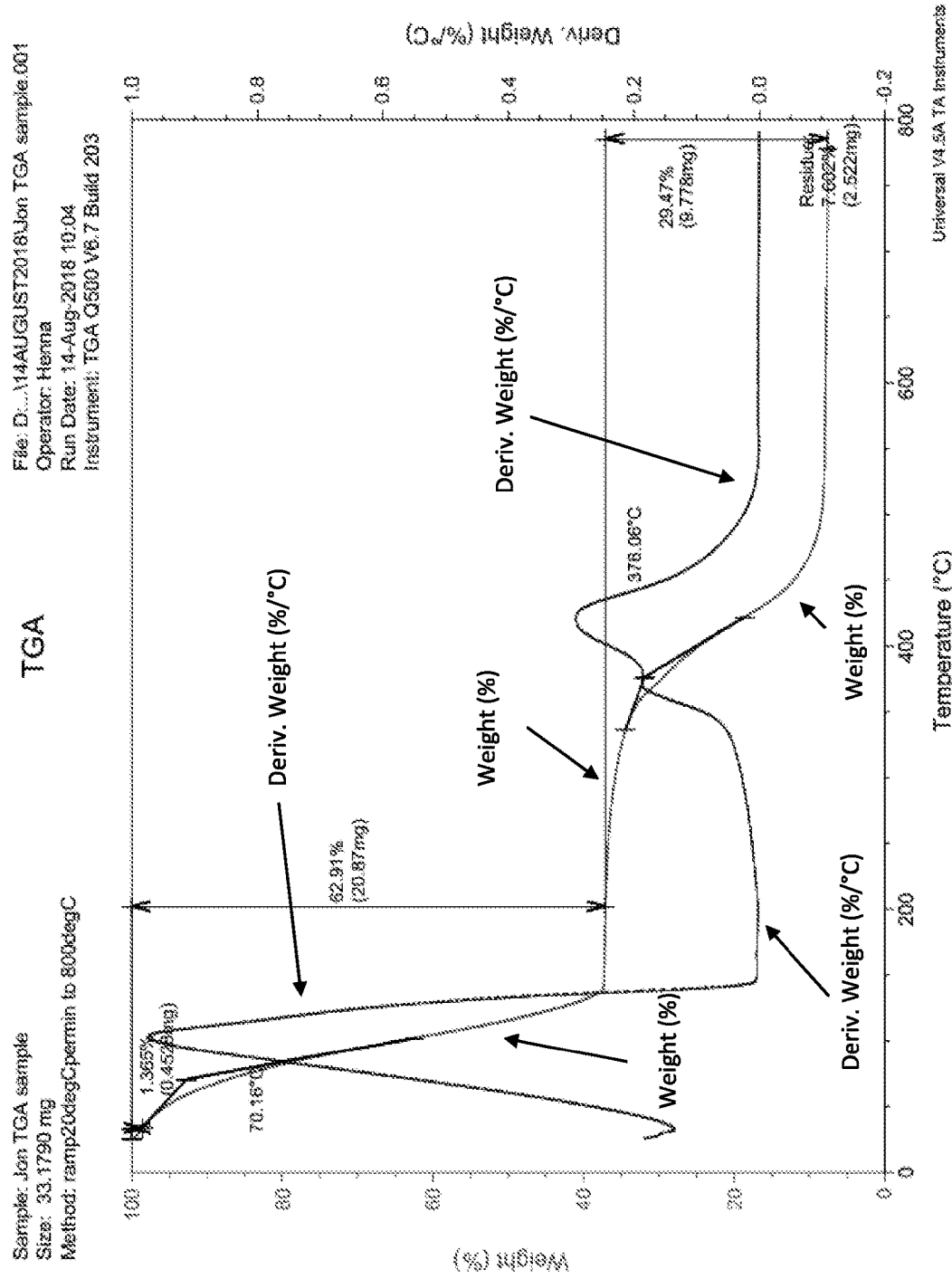
FIG. 6 is a thermogravimetric analysis (TGA) graph of silica capsules, encapsulating a phase change material, produced from a method in accordance with an example embodiment disclosed herein. (A) TGA graph of Crodatherm 29 silica capsules before purification. (B) TGA Graph of Crodatherm 29 silica capsules after purification.
Figure 6B:
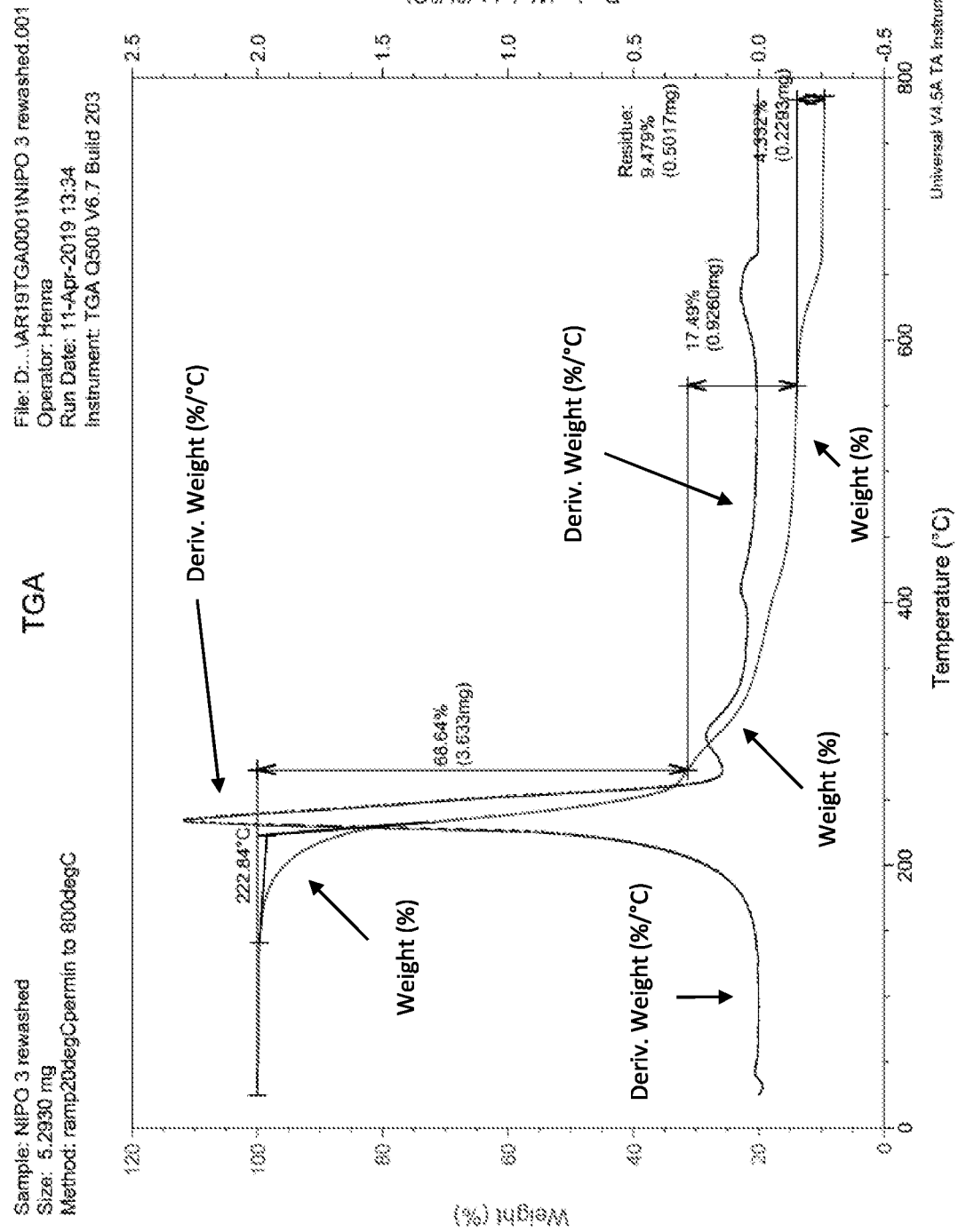

Solid content of the suspension/slurry and the composition of capsules were determined by thermogravimetric analysis (TGA). FIG. 6A shows the TGA graph of Crodatherm 29 silica capsules before purification. FIG. 6B shows the TGA graph of Crodatherm 29 silica capsules after purification. FIG. 6B shows the organic matter being over 80% (Crodatherm 29) with residue around 10% (silica) thus indicating Crodatherm 29 loaded coreshell particles.

The capsule morphology was confirmed by SEM analysis. Capsules with spherical morphology and no leakage when observed under SEM conditions (see FIG. 7). Given that the SEM used rather high vacuum and the capsules were seen retaining their spherical shapes, this is indicative of the robustness of the shells.

Figure 8A:
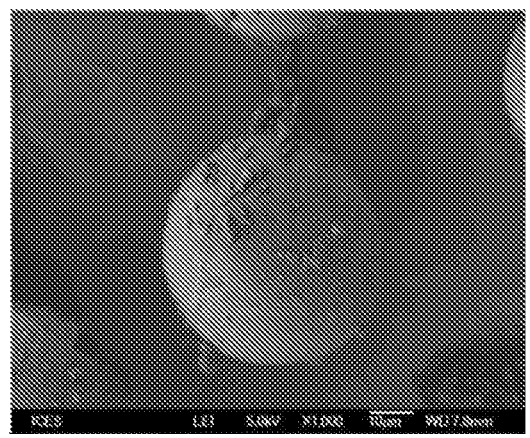
FIG. 8 shows the high scalability of the method of producing silica capsules, encapsulating a phase change material, in accordance with various embodiments disclosed herein. (A) is a SEM image (×1,000 magnification) showing a silica capsule that is about 50 μm produced by a method in accordance with an example embodiment disclosed herein. (B) is a SEM image (×5,000 magnification) showing silica capsules that are about 1 μm or less produced by a method in accordance with an example embodiment disclosed herein. (C) is a SEM image (×100 magnification) showing silica capsules that are about 20-50 μm produced by a method in accordance with an example embodiment disclosed herein.
Figure 8B:
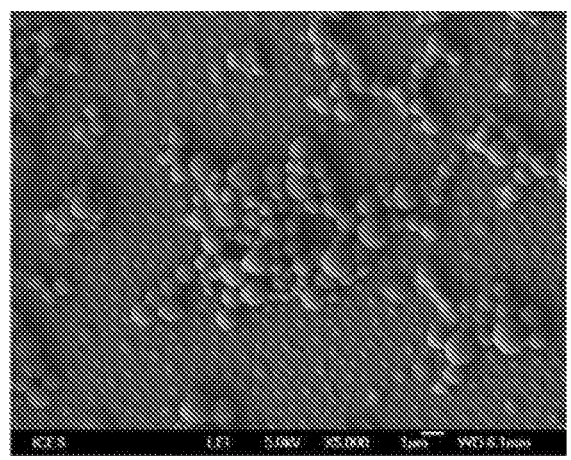
Figure 8C:
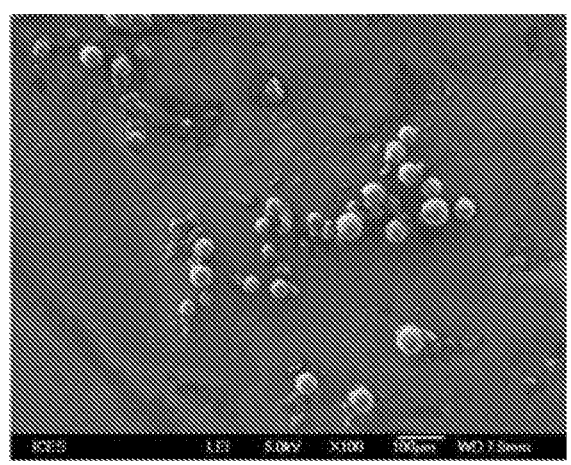

By varying a stirring speed of the mixture from between 400 rpm to 710 rpm after addition of CrodaTherm 29, the droplets sizes and hence the silica capsules sizes can be easily tuned. Silica capsules that were as small as <1 μm (see FIG. 8B), as well as silica capsules that were as big as 50 μm (see FIG. 8A) were successfully synthesised. Medium-sized silica capsules having sizes of about 20 μm were also successfully obtained (see FIG. 8C).

Figure 9A:
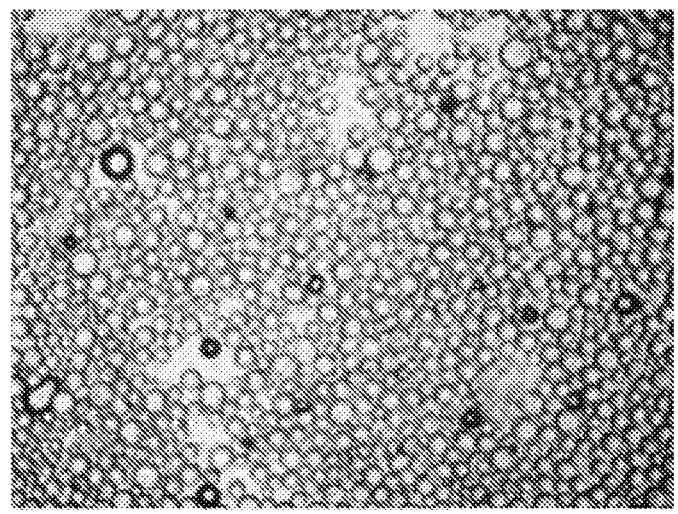
FIG. 9 shows the silica capsules, encapsulating a phase change material, produced from a method in accordance with an example embodiment disclosed herein. (A) shows the micro silica capsules under bright field microscopy at ×4 magnification. (B) shows the micro silica capsules under dark field microscopy at ×10 magnification.
Figure 9B:
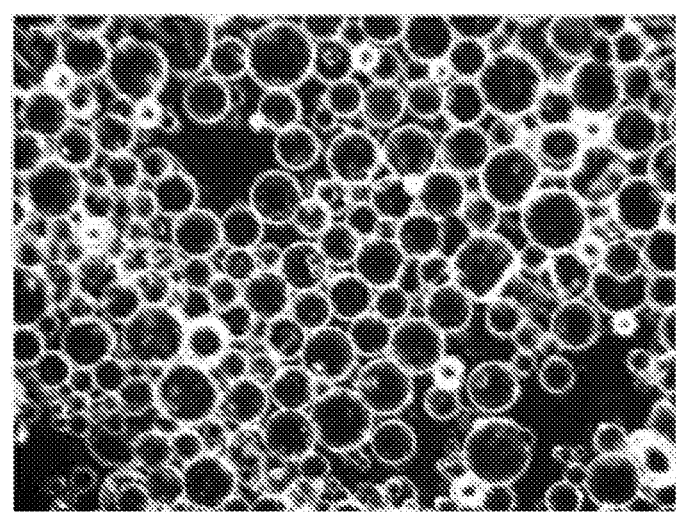

FIGS. 9A and 9B show the micro silica capsules under bright field microscopy and dark field microscopy respectively.

Example 5: Comparative Experiments Demonstrating a Synergistic Action Between Salt and Ethanol Silica capsules were synthesised largely based on the method described in Example 4 above (stirring speed at 710 rpm), except that in this example, the silica capsules were synthesised: (i) without salt and ethanol; (ii) with salt only and no ethanol; and (iii) with ethanol only and no salt.

Figure 10A:
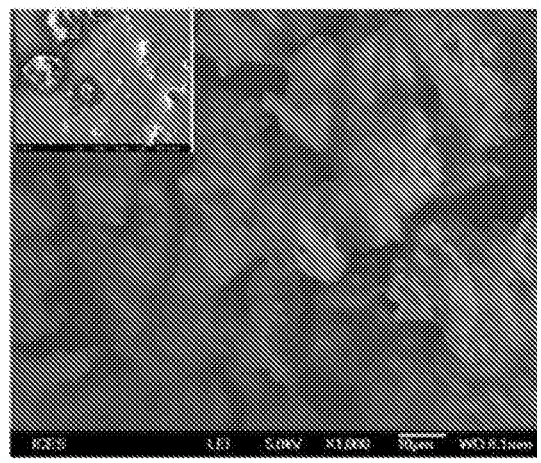
FIG. 10 shows broken capsules or films being obtained when synthesis was carried out in the absence of salt and/or ethanol. (A) is a SEM image (×1,000 magnification) showing a mixture of broken films and particles of silica obtained when synthesis of silica capsules was carried without salt and ethanol. (B) is a SEM image (×20,000 magnification) showing incomplete shell formation when synthesis of silica capsules was carried with salt only and no ethanol. (C) is a SEM image (×1,000 magnification) showing silica films with no observable capsular structures when synthesis of silica capsules was carried with ethanol only and no salt.

When silica capsules were synthesised in the absence of both salt and ethanol (condition (i)) using the phase change material CrodaTherm 29 as a template, the result was a mixture of broken films and particles of silica (see FIG. 10A). The phase change material was not encapsulated. The insert with higher magnification at the top left hand corner in FIG. 10A shows broken silica films indicating that any capsules formed were not robust and break to form silica films.

Figure 10B:
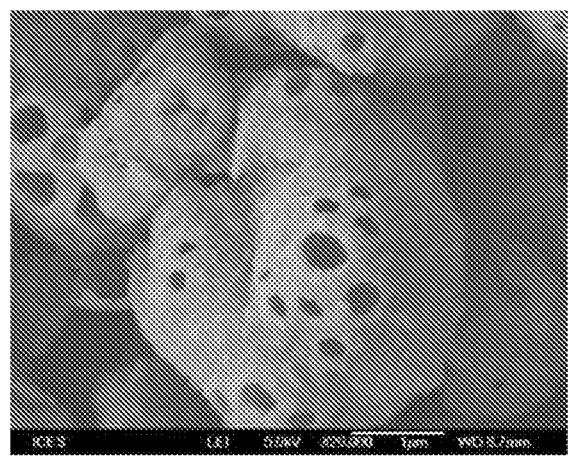

When silica capsules were synthesised in the presence of salt only without ethanol (condition (ii)) using the phase change material CrodaTherm 29 as a template, there was incomplete shell formation (see FIG. 10B). Multiple large holes were observed on the shells.

Figure 10C:
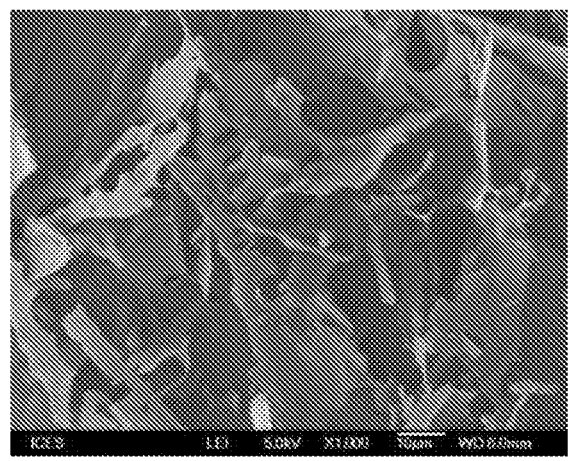

When silica capsules were synthesised in the presence of ethanol only without salt (condition (iii)), with silicone oil being used as the template, only silica films were observed (see FIG. 10C). No capsular structures were observed.

Figure 7:
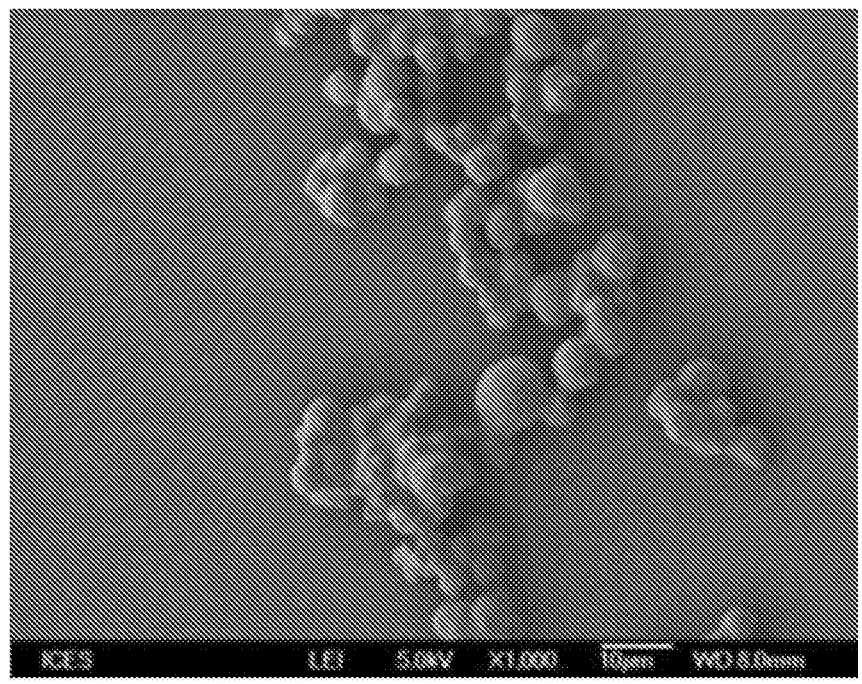
FIG. 7 is a SEM image (×1,000 magnification) showing the silica capsules, encapsulating a phase change material, with spherical morphology and no leakage when synthesis was carried out in accordance with an example embodiment disclosed herein.

By contrast, when silica capsules were synthesised in the presence of both salt and ethanol as previously demonstrated in Example 4, the result were capsules with spherical morphology and no leakage (see e.g. FIG. 7).

This example demonstrates the synergistic combination of salt and alcohol contributing to the formation of robust silica capsules. Notably, similar effects could not be achieved with salt alone (without ethanol) or with ethanol alone (without salt).

Example 6: High Reproducibility of the Method

Silica capsules encapsulating silicone oil were made based on the method described in Example 2 in 5 independent trials.

Figure 11:
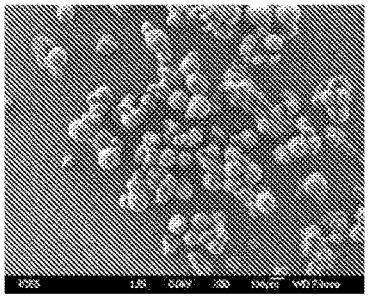
FIG. 11 is an assortment of SEM images showing the reproducible production of capsules in 5 different trials of a method in accordance with an example embodiment disclosed herein.
Figure 11:
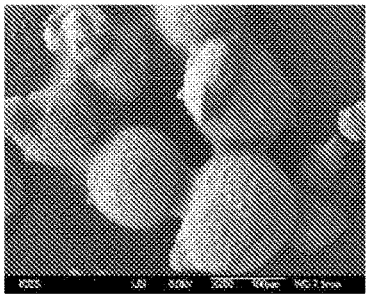
Figure 11:
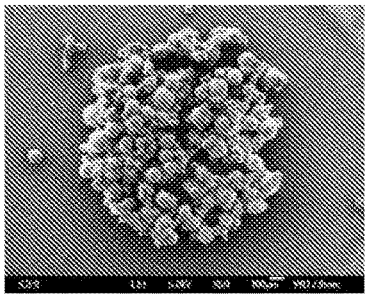
Figure 11:
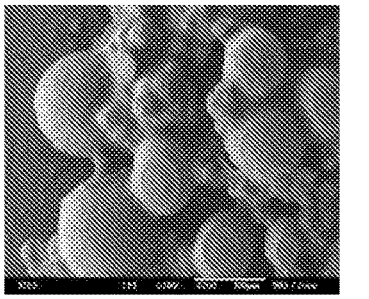
Figure 11:
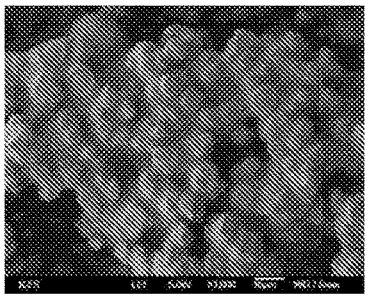
Figure 11:
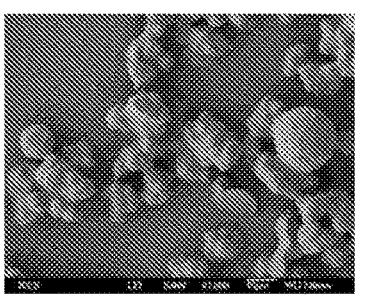
Figure 11:
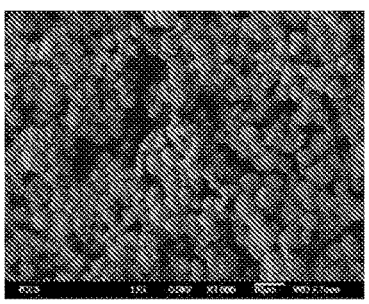
Figure 11:
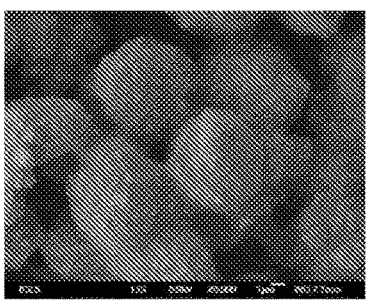
Figure 11:
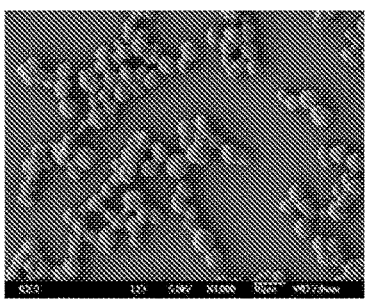
Figure 11:
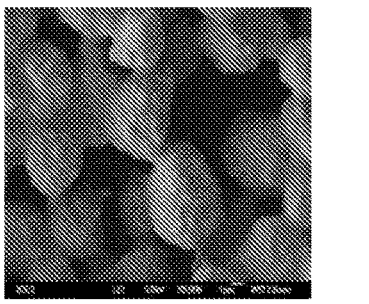

The synthesis method is highly reproducible. As shown in FIG. 11, the synthesis method was repeated 5 times, and in each trial, intact silica capsules were obtained.

Example 7: Demonstration of Robustness and Non-Breakage of Silica Capsules

Silica capsules encapsulating silicone oil were synthesised based on the method described in Example 2. After synthesis, the silica capsules were allowed to stand for 2-3 hours to allow capsules to cream to the top of the slurry. The removal of clear aqueous phase and repeating the process 2-3 times (topping up the removed water and allowing to stand and separating the clear part) finally provided a concentrated slurry free of ethanol.

After concentration, the resulting slurry has about 37 wt % silica capsules encapsulating silicone oil in a water/ethanol mixture. The wt % of the silicone oil in the slurry is 30% and wt % of the silica shell is 7%. Table 1 below shows the detailed composition of the resulting slurry.

TABLE 1

|  | weight | volume |
| --- | --- | --- |
| oil | 17.84 g | 20 mL |
| Silica | 3.49 g | 7.7 mL* |
| Triton X | 2.14 g | 2 mL |
| Sodium Chloride | 0.2456 g | Not estimated |
| ethanol | Not determined. | Negligbile |
| water | 25 g | 25 mL |
| total | 48.7 g | 55 mL |

*assuming density is 2.2 g/cc

The primary particle size was measured to be below 10 micrometers, with majority of the particles having sizes below 5 micrometers. This was confirmed by thermogravimetric analysis (TGA), light microscopy and scanning electron microscopy (SEM).

Figure 12:
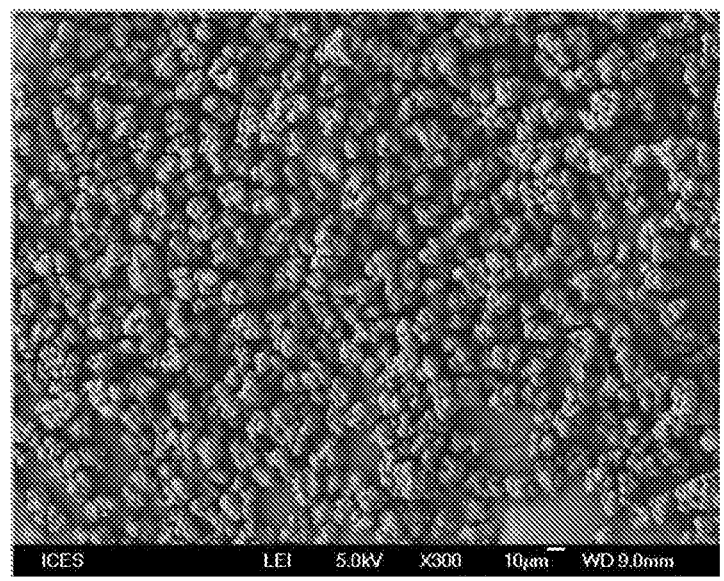
FIG. 12 is an SEM image (×300 magnification) showing the non-breakage of the concentrated silica capsules under vacuum at 50° C. in accordance with an example embodiment disclosed herein.

The silica capsules did not break at the high concentration of 37 wt %, thus demonstrating the robustness of the silica capsules. To further test the robustness of silica capsules, the capsules were further subjected to combined vacuum and heat treatment at 50° C. As shown in FIG. 12, the primary particles remain intact. There was no observable breakage or rupture of the particles.

Furthermore, while the concentration of the silica capsules led to particles aggregation, the aggregation was found to be dispersible without substantial breakage of the particles.

The TGA analysis shows that there was no change between the ratio of silica to silicone oil or observable leakage. Only water and ethanol were removed in the concentration process, thus further demonstrating the robustness of the silica shells.

Applications

Embodiments of the method overcome the fragility or easy breakability associated with silica capsule products produced by known methods. By identifying a synergistic action between two parameters (i.e. alcohol and salt leading to an ion association phenomena) for robust shell formation, embodiments of the method are able to produce micron-sized capsules that are resistant to breakage under stress conditions. Notably, embodiments of the method do not necessarily require coating an additional layer on top of the silica capsules to enhance deposition of materials or to strengthen the silica shell.

While capsules produced by known methods, including those that are as small as 8 μm, often suffer from breakage upon drying, similar breakages are not observed with the silica capsules produced by embodiments of the method.

The combination of alcohol and salt disclosed herein is non-trivial, especially since past efforts to optimise conditions for forming robust capsules with high reproducibility by varying individual parameters (as opposed to multiple parameters) such as temperature, pH, ionic strength, type of precursor for silica, surfactant etc. were met with only limited success. The disclosure has arrived at a unique condition that provides a general method to obtain robust capsules.

Advantageously, embodiments of the method are also environmentally friendly, easy to perform, cost-effective and have substantially high reproducibility and scalability. It would be appreciated that reproducibility and scalability are difficult to achieve if the shells frequently break during encapsulation, as is the case in the known methods.

The silica capsules are useful in various fields including but not limited to coatings (e.g. active loaded coatings), flavours and personal care formulations.

It will be appreciated by a person skilled in the art that other variations and/or modifications may be made to the embodiments disclosed herein without departing from the spirit or scope of the disclosure as broadly described. For example, in the description herein, features of different example embodiments may be mixed, combined, interchanged, incorporated, adopted, modified, included etc. or the like across different example embodiments. The present embodiments are, therefore, to be considered in all respects to be illustrative and not restrictive.

The invention claimed is:

1. A method of producing silica capsules, the method comprising:
    adding a silica precursor to emulsified droplets in the presence of a salt at a concentration of from 10 mM to 20 mM and an alcohol at a concentration of at least about 20% v/v to produce an ion association effect to enhance silica growth around the emulsified droplets, thereby forming silica capsules.

2. The method of claim 1, wherein the adding step is carried out in an acidic pH environment.

3. The method of claim 2, wherein the acidic pH is from pH 2 to pH 5.

4. The method of claim 1, wherein the salt comprises a metal salt selected from the group consisting of a sodium salt, a potassium salt, a calcium salt, an aluminum salt, and combinations thereof.

5. The method of claim 4, wherein the salt comprises a metal salt selected from the group consisting of sodium chloride, potassium chloride, calcium chloride, aluminum chloride, and combinations thereof.

6. The method of claim 1, wherein the alcohol is selected from the group consisting of: methanol, ethanol, propanol, isopropanol and combinations thereof.

7. The method of claim 1, wherein the silica precursor comprises an alkoxy silane.

8. The method of claim 1, wherein the method is carried out at a temperature of no more than about 60° C.

9. The method of claim 1, wherein the emulsified droplets are substantially non-polar.

10. The method of claim 1, further comprising dispersing a substantially non-polar substance in a polar solvent to obtain the emulsified droplets.

11. The method of claim 1, further comprising evaporating the emulsified droplets encapsulated by the silica capsules to obtain hollow silica capsules.

12. The method of claim 1, wherein the method is carried out using water as the primary medium.

13. The method of claim 12, further comprising concentrating the silica capsules to an amount of at least about 30 wt % in water.

14. A silica capsule produced by the method of claim 1, wherein the silica capsule is no more than about 100 microns in size and is substantially resistant to breaking under scanning electron microscopy (SEM) vacuum conditions.

15. The silica capsule of claim 14, further comprising a substantially non-polar substance encapsulated by the silica capsule.

16. The silica capsule of claim 15, wherein the substantially non-polar substance is selected from the group consisting of: aroma, flavour, fragrance, perfume, drug, therapeutic, phase change material, cosmetic, skin care substance, silicone oil, pentane, dodecane and combinations thereof.

17. The silica capsule of claim 14, wherein the silica capsule is substantially hollow.

18. The silica capsule of claim 14, wherein the silica capsule has one or more of the following properties: (i) capable of being loaded with cargo of at least about 80% by weight of the loaded silica capsule without substantial breakage; (ii) capable of being concentrated in water to a concentration of at least about 30 wt % without substantial breakage, (iii) capable of being subjected to scanning electron microscopy (SEM) vacuum conditions without substantial breakage, and (iv) is stable under ambient conditions for no less than about 6 months without substantial breakage.

* * * * *